(12) United States Patent
Ned et al.

(10) Patent No.: US 10,871,415 B2
(45) Date of Patent: Dec. 22, 2020

(54) HIGH TEMPERATURE PROTECTED WIRE BONDED SENSORS

(71) Applicant: KULITE SEMICONDUCTOR PRODUCTS, INC., Leonia, NJ (US)

(72) Inventors: Alexander A. Ned, Kinnelon, NJ (US); Leo Geras, Pearl River, NY (US); Sorin Stefanescu, New Milford, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 16/552,172

(22) Filed: Aug. 27, 2019

(65) Prior Publication Data

US 2020/0011757 A1    Jan. 9, 2020

Related U.S. Application Data

(63) Continuation of application No. 15/667,117, filed on Aug. 2, 2017, now Pat. No. 10,436,662.

(51) Int. Cl.
| | |
|---|---|
| *H01L 27/20* | (2006.01) |
| *G01L 19/06* | (2006.01) |
| *G01L 9/00* | (2006.01) |
| *G01L 19/00* | (2006.01) |
| *G01L 19/14* | (2006.01) |

(52) U.S. Cl.
CPC ........ *G01L 19/0681* (2013.01); *G01L 9/0042* (2013.01); *G01L 9/0044* (2013.01); *G01L 9/0048* (2013.01); *G01L 9/0054* (2013.01); *G01L 19/0069* (2013.01); *G01L 19/0084* (2013.01); *G01L 19/0627* (2013.01); *G01L 19/147* (2013.01)

(58) Field of Classification Search
CPC . G01L 19/0681; G01L 9/0042; G01L 9/0044; G01L 9/0048; G01L 9/0054; G01L 19/0069; G01L 19/0084; G01L 19/0627; G01L 19/147
See application file for complete search history.

(56) References Cited

U.S. PATENT DOCUMENTS

| | | | |
|---|---|---|---|
| 5,614,678 A | 3/1997 | Kurtz et al. | |
| 5,955,771 A | 9/1999 | Kurtz et al. | |
| 8,656,784 B2 | 2/2014 | Ned et al. | |
| 2009/0108382 A1 | 4/2009 | Eriksen et al. | |

*Primary Examiner* — Fernando L Toledo
*Assistant Examiner* — Valerie N Newton
(74) *Attorney, Agent, or Firm* — Troutman Pepper Hamilton Sanders LLP; James E. Schutz; Mark Lehi Jones

(57) ABSTRACT

Systems and methods are disclosed for packaging sensors for use in high temperature environments. In one example implementation, a sensor device includes a header; one or more feedthrough pins extending through the header; and a sensor chip disposed on a support portion of the header. The sensor chip includes one or more contact pads. The sensor device further includes one or more wire bonded interconnections in electrical communication with the respective one or more contact pads and the respective one or more feedthrough pins. The sensor device includes a first sealed enclosure formed by at least a portion of the header. The first sealed enclosure is configured for enclosing and protecting at last the one or more wire bonded interconnections and the one or more contact pads from an external environment.

20 Claims, 13 Drawing Sheets

HIGH TEMPERATURE PROTECTED WIRE BONDED SENSORS

CROSS-REFERENCE TO RELATED APPLICATIONS

This application is a continuation claiming priority under 35 U.S.C. § 120 to U.S. patent application Ser. No. 15/667,117, filed 2 Aug. 2017, and published as U.S. Patent Application Publication No. US20190041288 on 7 Feb. 2019, the contents of which are incorporated herein by reference as if fully set forth.

FIELD

The disclosed technology relates to electronic device packaging and electrical interconnections suitable for high temperature operability, and in particular, to package construction and techniques for protection of wire bonded sensors.

BACKGROUND

Some of the most challenging aspects associated with producing reliable sensors suitable for use in harsh, high temperature environments include providing appropriate packaging for housing the sensing element and selecting materials for the electrical interconnections among the sensing element and the selected package.

Various approaches have been proposed for packaging piezoresistive pressure sensors, including the utilization of a leadless semiconductor sensor chip having contacts disposed on the surface of the chip, and configured to accept pins for electrical communication, as described in U.S. Pat. No. 5,955,771 to Kurtz, et al., and assigned to Kulite Semiconductor Products, Inc., the Assignee of this Application, the contents of which are incorporated herein by reference. The leadless sensor chip approach relies on achieving excellent thermal expansion match of all of the components used, while making electrical interconnections using conductive glass/metal mixture.

As sensing elements are needed for use in even more extreme environments, including higher-pressure and/or higher temperature applications, there is a need for specific sensor designs with associated packaging and interconnections, such as described in U.S. Pat. No. 5,614,678 to Kurtz, et al., and assigned to Kulite Semiconductor Products, Inc., the Assignee of this Application, the contents of which are incorporated herein by reference.

The leadless sensor approach may be appropriate in certain sensing applications; however, it would be beneficial to utilize mature wire bonding technology for metallic interconnections. Wire bonding technology has long been considered inadequate for high temperature sensor use due to reliability issues when exposed to high temperature in corrosive and/or oxidizing media.

A need exists for systems and methods in which a transducer chip can be secured within a housing and electrically connected using wire bonding, with the associated interconnections capable of reliable operation at elevated temperatures and/or extreme environments.

BRIEF SUMMARY

Certain example implementations of the disclosed technology may include systems and methods for packaging sensors for reliable operation in high temperature environments. In one example implementation, a sensor device is provided. The sensor device includes a header; one or more feedthrough pins extending through the header; and a sensor chip disposed on a support portion of the header. The sensor chip includes one or more contact pads. The sensor device further includes one or more wire bonded interconnections in electrical communication with the respective one or more contact pads, and the one or more wire bonded interconnections are further in electrical communication with the respective one or more feedthrough pins. The sensor device includes a first sealed enclosure formed by at least a portion of the header. The first sealed enclosure is configured to isolate at least the one or more wire bonded interconnections and the one or more contact pads from an external environment. The sensor device is configured for increased reliability when used in high temperature environments.

In another example implementation, a method is provided. The method can include sealing a sensor chip to a support portion of a header, wherein the sensor chip includes one or more sensor contact pads, and the header includes one or more bores extending through the header. The method includes attaching one or more electrical isolators to the support portion of the header; disposing one or more feedthrough pin contact pads on the respective one or more electrical isolators; attaching a first end of one or more wire bonded interconnections to the respective one or more sensor contact pads; attaching a second end of the one or more wire bonded interconnections to the respective one or more feedthrough pin contact pads; installing one or more feedthrough pins through the respective one or more bores such that the one or more feedthrough pins are in electrical communication with the respective one or more feedthrough pin contact pads; and forming a first sealed enclosure to enclose and protect one or more of the wire bonded interconnections, the one or more sensor contact pads, the one or more feedthrough pin contact pads, the one or more feedthrough pins, and at least the first portion of the sensor chip.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Certain example implementations of the disclosed technology include devices and techniques for providing electronic device packaging and interconnections suitable for high temperature operability.

The terms "interconnection," "interconnect," "connection," "junction," etc., as used herein, may refer to a physical and/or electrical connection between or among two or more components and/or materials, including but not limited to conductors, semiconductors, insulators, contact pads, wires, barrier layers, oxides, etc.

The disclosed technology includes systems and methods for making and utilizing sensors with packaging having internal electrical interconnections that are produced by wire bonding. Certain example implementations include sensor package design and construction that provides an inert environment for the sensing element, the wire bonded interconnects, and the associated contact pads. The example embodiments disclosed herein may enable a variety of sensor chip designs to be packaged for specific measurements in various applications, including, but not limited to high temperature environments and/or corrosive environments. In accordance with an example implementation of the disclosed technology, the sealing of the wire bonds within the inert packaging environment may enable the device to operate in conductive media, and may reduce or eliminate the effects of corrosion on the metallic interface(s). Furthermore, certain example implementation of the disclosed technology may greatly slow down interdiffusion of metals, thus allowing the barrier metals to survive at higher temperatures (for example, above 600° C.) for longer periods of time.

Several embodiment variations of the disclosed technology are described herein with reference to the accompanying figures. FIGS. 1-12 depict example transducers and related packaging structures, according to certain example implementations of the disclosed technology. A general overview of the disclosed technology and associated example embodiments may be best understood by reviewing groups of the attached figures. For example, FIGS. 1-8 illustrate wire bonded sensors, sensor chip pattern layouts, and associated packaging with all of the metal contacts and electrical interconnections contained within a sealed inert environment 106, but with portions or regions of the sensor chip exposed to the measurement environment. For example, in FIGS. 1-8, the exposed sensor chip portions 102 (i.e., regions exposed to the measurement environment) do not include contacts or electrically active or electrically functional components. Such transducers are functional at high temperatures (for example, above 600° C.) in any measurement environments that are not corrosive or are not significantly or destructively chemically reactive with the transducer header 104 and/or with the exposed sensor chip regions 102.

Figure 9:
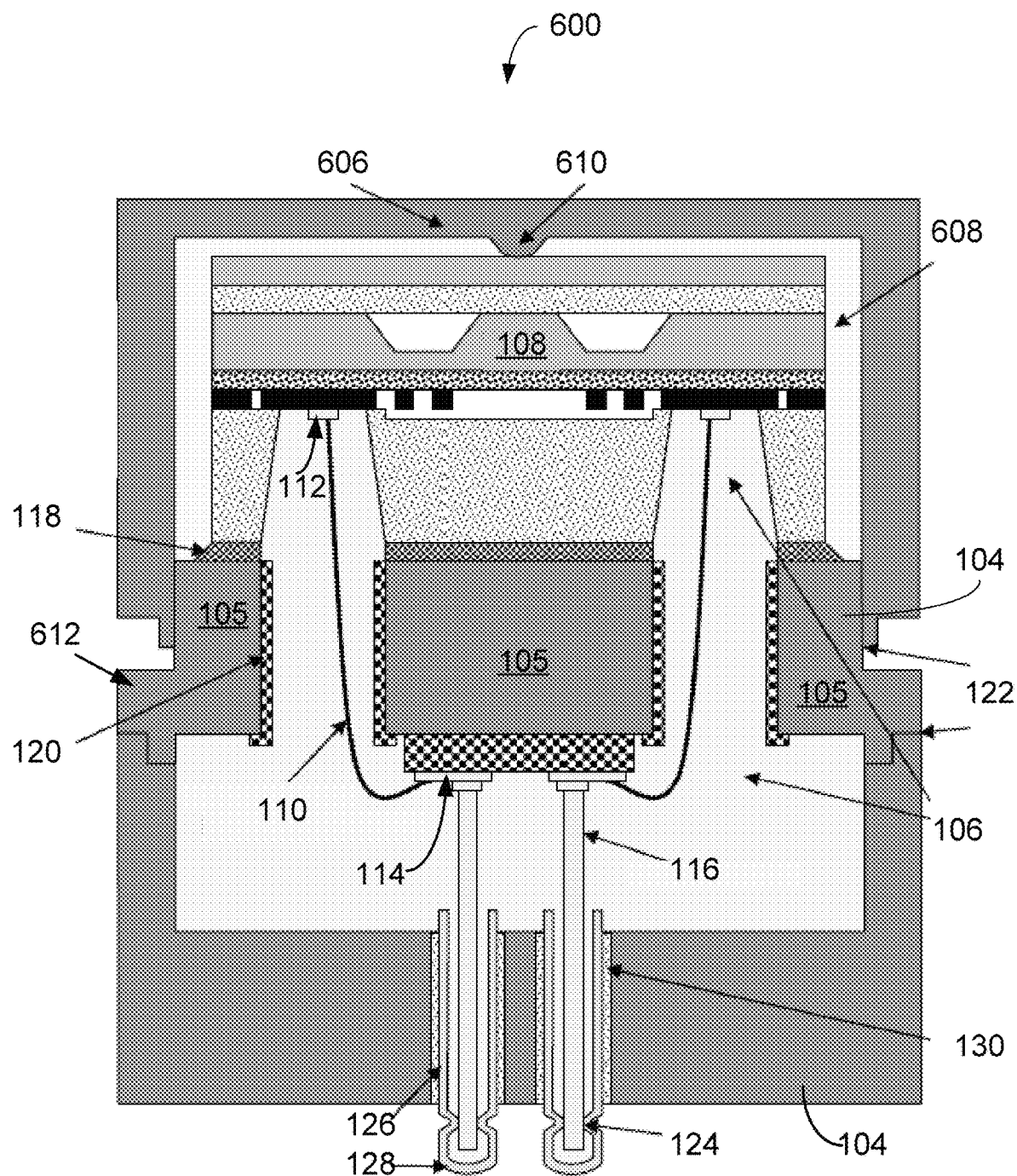
FIG. 9 depicts another example sensor device 600 structure configured with a protective outer diaphragm 606 for providing a sealed sensor chip environment 608, according to an example implementation of the disclosed technology.
Figure 10:
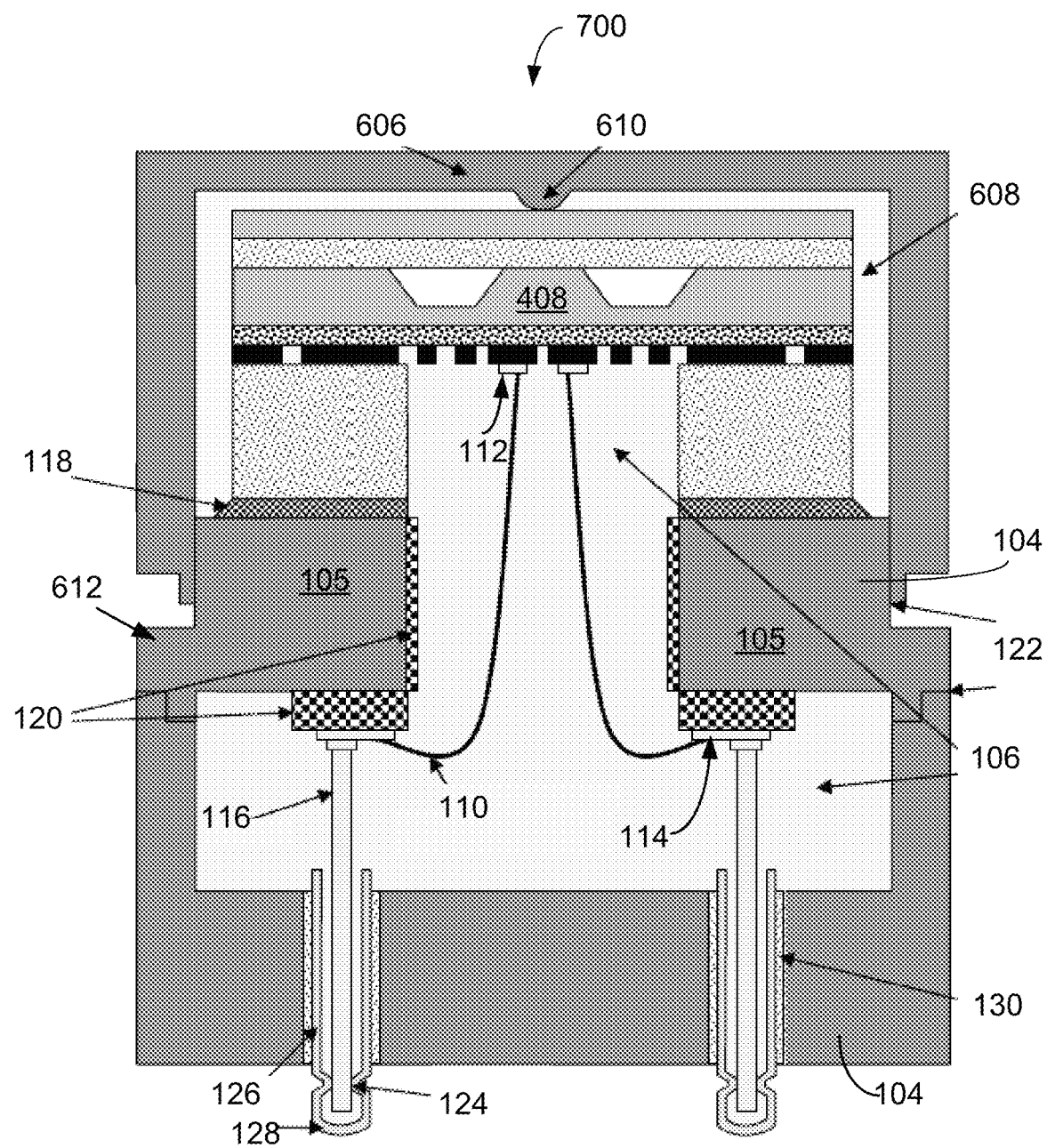
FIG. 10 depicts another example sensor device 700 structure configured with a protective outer diaphragm 606 for providing a sealed sensor chip environment 608, according to an example implementation of the disclosed technology.

FIGS. 9 and 10 depict certain example high temperature transducer embodiments 600, 700 in which all metal contacts and all electrical interconnections are contained in a first sealed inert environment 106, and all the remaining portions of the sensor chip (not contained in the first sealed inert environment 106) are contained in a second sealed inert environment 608.

Figure 11:
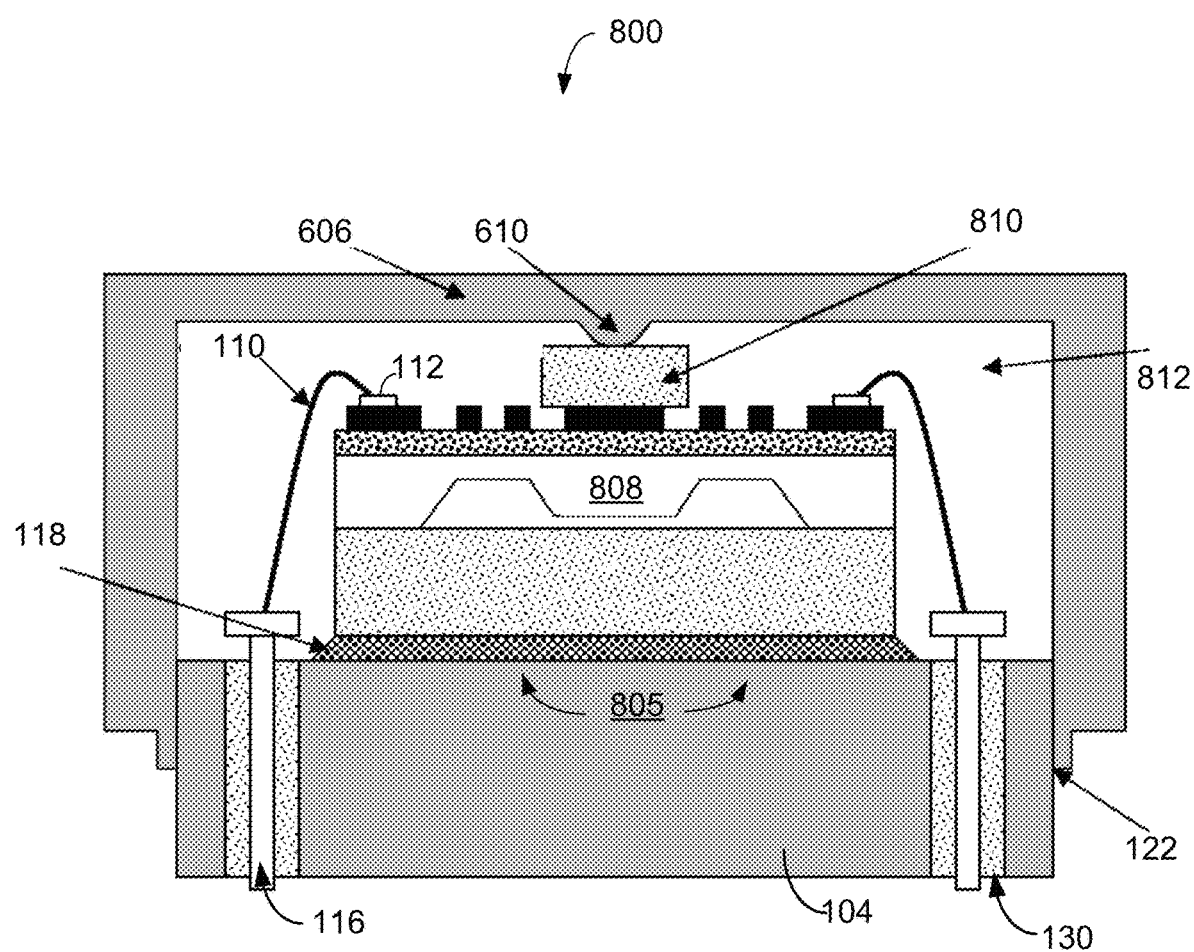
FIG. 11 depicts another sensor device 800 structure having a sealed environment 812, and with a sensor chip 808 disposed directly on a portion of the base of the header 104, according to an example implementation of the disclosed technology.
Figure 12:
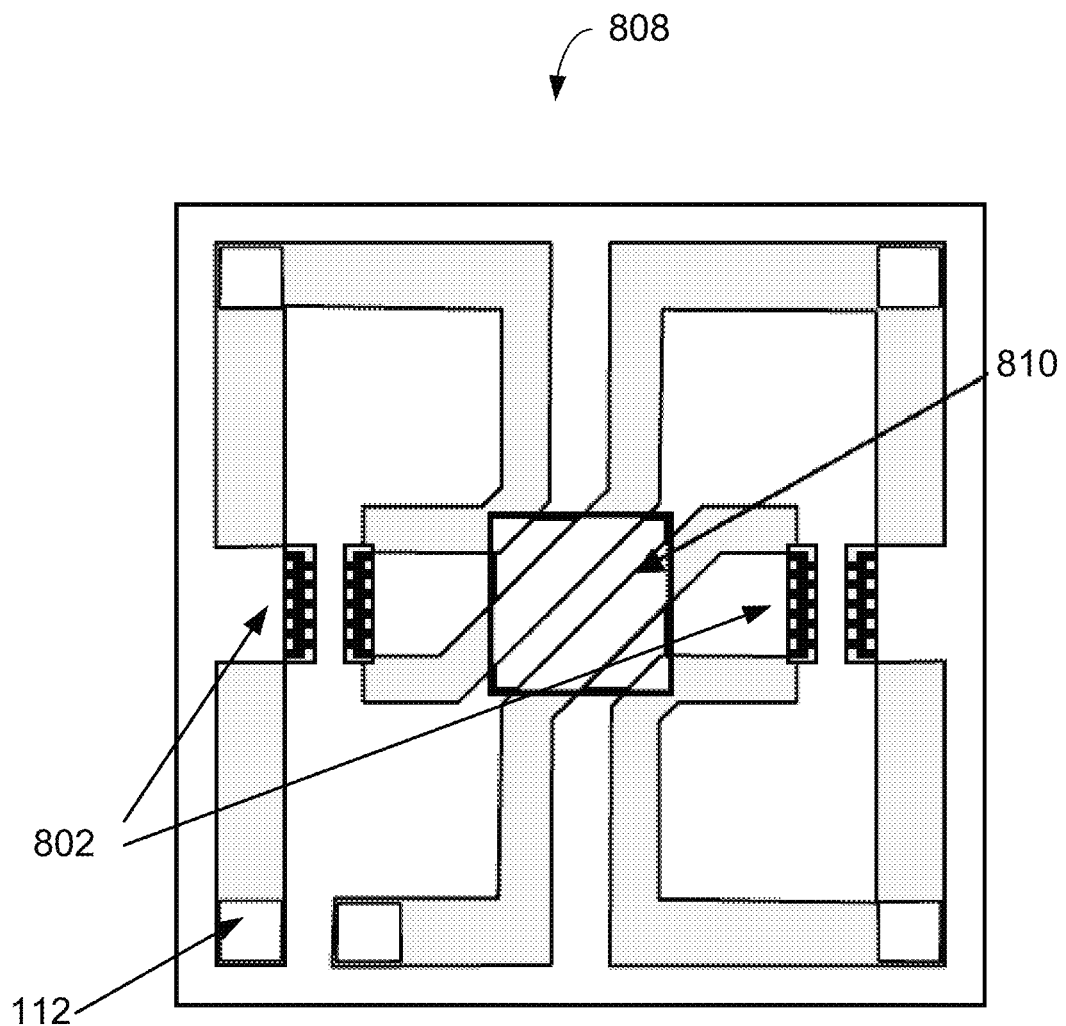
FIG. 12 shows a top-view layout of a high temperature sensor chip 808, according to an example implementation of the disclosed technology.

FIGS. 11 and 12 depict another example implementation of a high temperature transducer 800 and corresponding sensor chip 808 with all metal contacts, all electrical interconnections, and the entire sensor chip 808 contained in the same sealed inert environment 812. As disclosed herein, and by virtue of the sealed environments 106, 608, 812, the transducers depicted in FIGS. 9-11 may be functional and suitable for use at high temperatures (above 600° C.) in measurement environments that are not corrosive or that are not significantly or destructively chemically reactive with the transducer header 104, but that could be corrosive or significantly or destructively chemically reactive with the associated sensor chip 108, 408, 808. Some of additional details of the example embodiments will now be discussed with reference to FIGS. 1-13.

Certain example implementations described herein may be utilized to address the need for enhancing the reliability of sensor devices, particularly for use in high temperature and/or corrosive environments. Certain example implementations provide one or more protective enclosures to isolate wire bonds, contact pads, and/or sensor chips from an external environment. Furthermore, in certain example implementations, the enclosure(s) may include an inert environment to further prevent or reduce degradation of the associated enclosed internal components.

Figure 1:
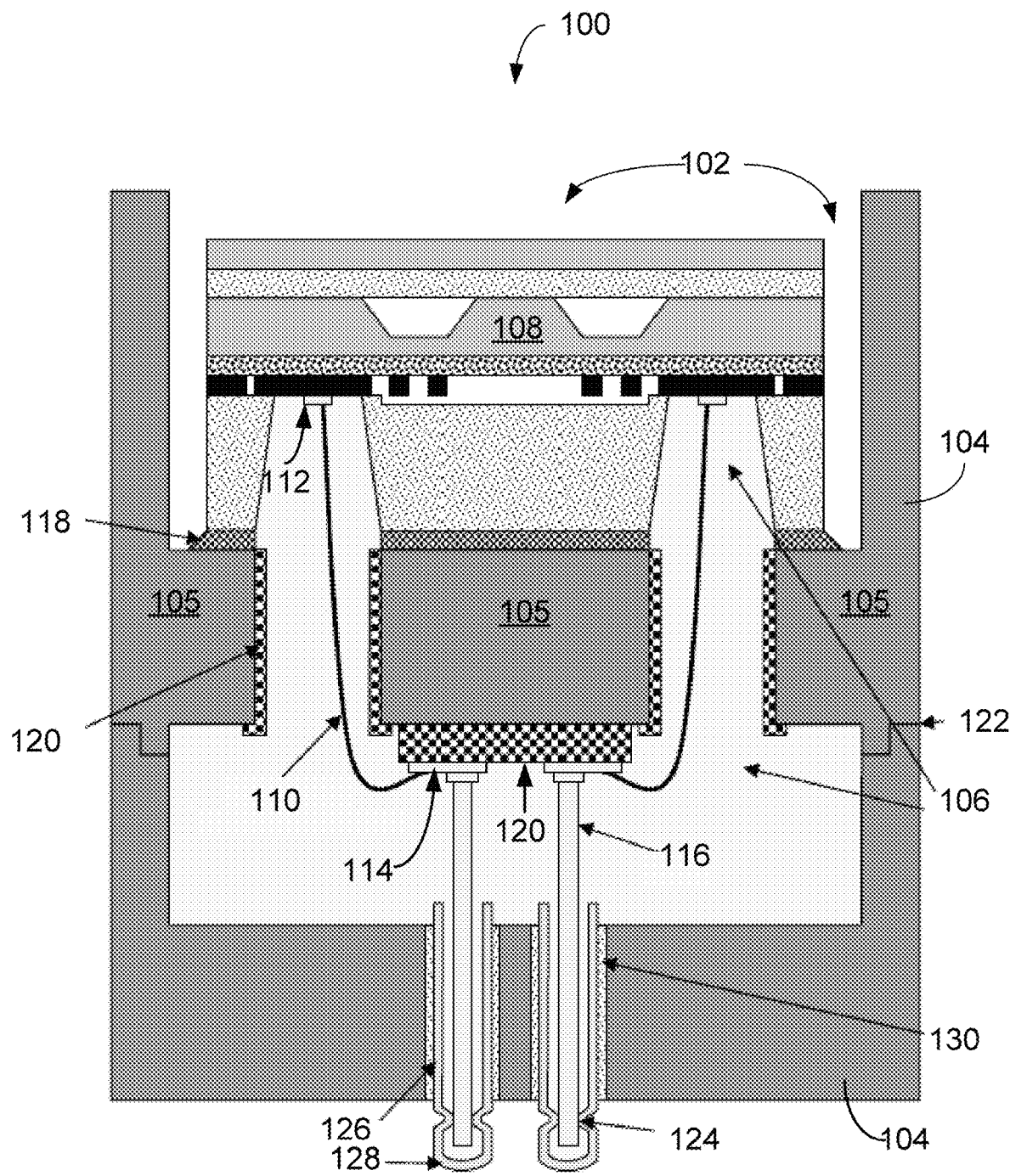
FIG. 1 depicts a cross-sectional side view of a sensor device 100 structure including a sensor chip 108 with (externally) exposed sensor chip portions 102, according to an example implementation of the disclosed technology.

FIG. 1 depicts a cross-sectional side view of a sensor device 100 structure including a sensor chip 108 with (externally) exposed sensor chip portions 102. In this example implementation, the sensor chip 108 substrate may be supported by support portions 105 of the header 104. In an example implementation, a seal 118, such as glass (or other high temperature sealing or chip mounting material) may be utilized between the bottom of the chip substrate and the support portion 105 of the header 104. As depicted in this example embodiment, the sensor chip 108 substrate may include vias that allow access to the sensor chip contact pads 112, and that allow wire bonds or other electrical interconnections 110 to pass through the vias for connection to the feedthrough pins 116. Upon assembly of the sensor device 100 package, the vias may form part of the sealed interconnect environment 106 for protection of the internal portion of the sensor chip 108, the electrical interconnections 110, the sensor chip contact pads 112, the pin contact pads 114, the feedthrough pins 116, etc. In accordance with an example implementation of the disclosed technology, the header 104 may include various upper and lower sections that may be joined with a header weld 122 to further seal the sensor device 100, for example, after the internal connections are made and after the appropriate internal assembly is completed.

The example electrical interconnection 110 shown in FIG. 1 may be utilized for electrically connecting the sensor chip contact pads 112 to pin contact pads 114 that may be in communication with the feedthrough pins 116. The feedthrough pins 116 may be fed through the bottom portion of the header 104 and sealed to the header 104. In this example implementation, the use of wire bonding is depicted for the electrical interconnection 110, however, certain implementations may utilize welding, or other appropriate techniques for joining metal wires to the sensor chip contact pads 112, and to corresponding pin contact pads 114.

In accordance with an example implementation of the disclosed technology, the electrical interconnections 110 and pin contact pads 114 may be isolated from the header 104 and/or from the support portions of the header 105 by high temperature electrical isolators 120. In an example implementation, the pin contact pads 114 may be physically secured to a support portion 105 of the header 104, but electrically isolated/separated from the header material by the high temperature electrical isolator 120. In an example implementation of the disclosed technology, the electrical isolator 120 may be utilized as needed to prevent unwanted electrical contact or communication between the electrical interconnection components and certain portions of the sensor device 100 packaging.

FIG. 1 also depicts an example embodiment that may utilize feedthrough pin inserts 126 for accepting the feedthrough pins 116. In certain example implementations, the pin feedthrough inserts 126 may provide advantages for assembling and sealing the space between the pins/inserts and the walls of the associated feedthrough apertures in the housing 104. In an example implementation, a weld 124 or braze joint may be utilized to seal the pin 116 to the insert 126. In certain example implementations, the feedthrough pins 116 and the feedthrough inserts 126 may be made of metal. In an example implementation, the feedthrough inserts 126 may include a closed end 128, for example, to provide additional sealing and to prevent leakage in/out of the sealed interconnect environment 106. According to an example implementation of the disclosed technology, the space between the pins 116 and/or inserts 126 and the walls of the associated feedthrough apertures in the housing 104 may be sealed with an electrically isolating seal 130, such as glass.

In accordance with an example implementation of the disclosed technology, the sensor chip 108 may be sealed to and/or mounted on a support portion 105 of the header 104 using a seal 118 such as glass or other appropriate sealing or mounting material using a technique similar with that described in U.S. Pat. No. 5,955,771. For example, and as discussed above, the support portion 105 of the header 104 that supports the sensor chip 108 may also have installed high temperature electrical isolators 120 for providing electrical isolation between the electrical interconnections 110 and the header components 104, 105. These high temperature electrical isolators 120 may be made from ceramic, glass, or glass-ceramic type materials. In certain example implementations, some of these high temperature electrical isolators 120 may have metal contacts with metal pins attached to these metal contacts. In an example implementation, the metal pins can be made from one or more of: Kovar, stainless steel, Inconel, nickel, tungsten, molybdenum, platinum, or from other high temperature metal or metal alloy. In certain example implementations, the metal pins may have a plated or deposited metal layer of gold, platinum, or other suitable metal or metal alloy.

As discussed above with FIG. 1, the feedthrough inserts 126, which may include metal tubes, or other sealed electrical feedthroughs, may be installed within bores or apertures in the header 104 with high temperature electrically isolating seals 130 for providing electrical isolation between the electrical interconnections 110 and the header 104. In certain example implementations, the metal tube feedthrough inserts 126 can be made from one or more of: Kovar, stainless steel, Inconel, nickel, tungsten, molybdenum, platinum, or from other high temperature metal or metal alloy, and could have a plated or deposited metal layer of gold or platinum, or other suitable metal or metal alloy.

In accordance with certain example implementations of the disclosed technology, the header 104 and/or the support portion of the header 105 may be made from one or more of: Kovar, stainless steel, Inconel, nickel, tungsten, molybdenum, platinum, or from other suitable high temperature metal or metal alloy, and could have a plated or deposited metal layer of gold or platinum, or of other suitable metal or metal alloy.

In accordance with an example implementation of the disclosed technology, the metal feedthrough inserts 126 can be sealed into header 104, and at the same time can be electrically isolated from the header using a electrically isolating seal 130 that may include one or more of: glass, glass-ceramic, or other high temperature sealing and electrically isolating materials.

According to an example implementation of the disclosed technology, electrical interconnections 110 may be made between the sensor chip contact pads 112 and the corresponding pin contact pads 114 located on the high temperature electrical isolator 120 (which may be in contact with the support portion of the header 105. According to an example implementation of the disclosed technology, the electrical interconnections 110 may be made between the sensor chip contact pads 112 and the corresponding pin contact pads 114 by one or more of: wire bonding, welding, or other appropriate technique for joining metal wires to contacts. According to an example implementation of the disclosed technology, the electrical interconnections 110 may include wires made of one or more of: gold, platinum, aluminum, nickel, copper or other suitable metal or metal alloy.

In accordance with an example implementation of the disclosed technology, the metal pins 116 may be attached to the pin contact pads 114 and inserted into the metal feedthrough inserts 126, or into other sealed electrical feedthroughs and through the corresponding bores in the bottom portion of the header 104. In an example implementation, the metal pins 116 attached to the pin contact pads 114 may be configured with dimensions that allow them to reach inside the portions of the feedthrough inserts 126 (or other sealed electrical feedthroughs) protruding outside from the header 104.

In accordance with an example implementation of the disclosed technology, the upper and lower portions of the header 104 may be joined and sealed (for example, with a header weld 122) in an inert environment, preferably by electron beam welding, or by brazing, or other appropriate joining technique. In one example implementation, the upper and lower portions of the header 104 may be joined before the metal pins 116 that are attached to the pin contacts 114 and are sealed into feedthrough inserts 126. In another example implementation, the upper and lower portions of the header 104 may be joined at the same time the metal pins 116 that are attached to the pin contacts 114 and are sealed into feedthrough inserts 126. In yet another example implementation, the upper and lower portions of the header 104 may be joined after the metal pins 116 are attached to the pin contacts 114 and are sealed into feedthrough inserts 126.

If the metal pins 116 are sealed into the feedthrough inserts 126 after the upper and lower header portions are joined and sealed together, then this last sealing and joining process may be done in an inert environment to ensure that all metal contacts and electrical interconnections inside the sensor device 100 are contained in an inert environment.

In accordance with certain example implementations of the disclosed technology, certain manufacturing steps may be carried out in an inert environment, such as in a chamber flooded with an inert gas such as nitrogen, helium, or argon. In certain example embodiments, the inert environment may help eliminate the formation of oxides or other unwanted materials during the welding and/or sealing processes. In certain example implementations, by sealing the various enclosures in the inert environment, corrosive or reactive gasses in the internal portion(s) of the sensor device may be reduced or eliminated. In this respect, the reliability and/or lifetime of the device may be enhanced or extended, particularly in high temperature use environments.

In certain example implementations an inert gas substantially devoid of other materials may flow into a processing chamber, oven, or other assembly cavity to displace oxygen. The presence of inert gas may provide an oxygen-free environment to shield the associated components of the sensor device parts, for example, to inhibit the formation of oxides during the sealing process and/or to displace oxygen from the internal enclosure of the sensor device before it is welded and/or sealed. In some implementations, the assembly and/or sealing of the sensor device in the inert environment may allow the formation of welds or seals between component parts without the use of fluxes and/or mechanical scrubbing, while the inert gas-rich environment may further prevent the formation of additional oxides on the welds, seals, or adhesives.

According to an example implementation of the disclosed technology, and with continued reference to FIG. 1, the metal feedthrough inserts 126 (or other sealed electrical feedthroughs) may be manufactured with a closed end 128 and may be sealed at the end protruding outside the header 104. In this example configuration, the metal feedthrough inserts 126 may be first crimped after inserting the metal pins 116 and welded, preferably by resistance welding, brazed, or permanently joined mechanically and electrically by another appropriate metal joining technique.

In an example implementation, the upper and lower header portions may be joined (i.e., by the header weld 122) and sealed in an inert environment, preferably by electron beam welding, or by brazing, or other appropriate joining technique, before, at the same time, or after the metal pins 116 are joined to the feedthrough inserts 126 (or other sealed electrical feedthroughs) by welding, brazing, or other appropriate joining technique.

Figure 2:
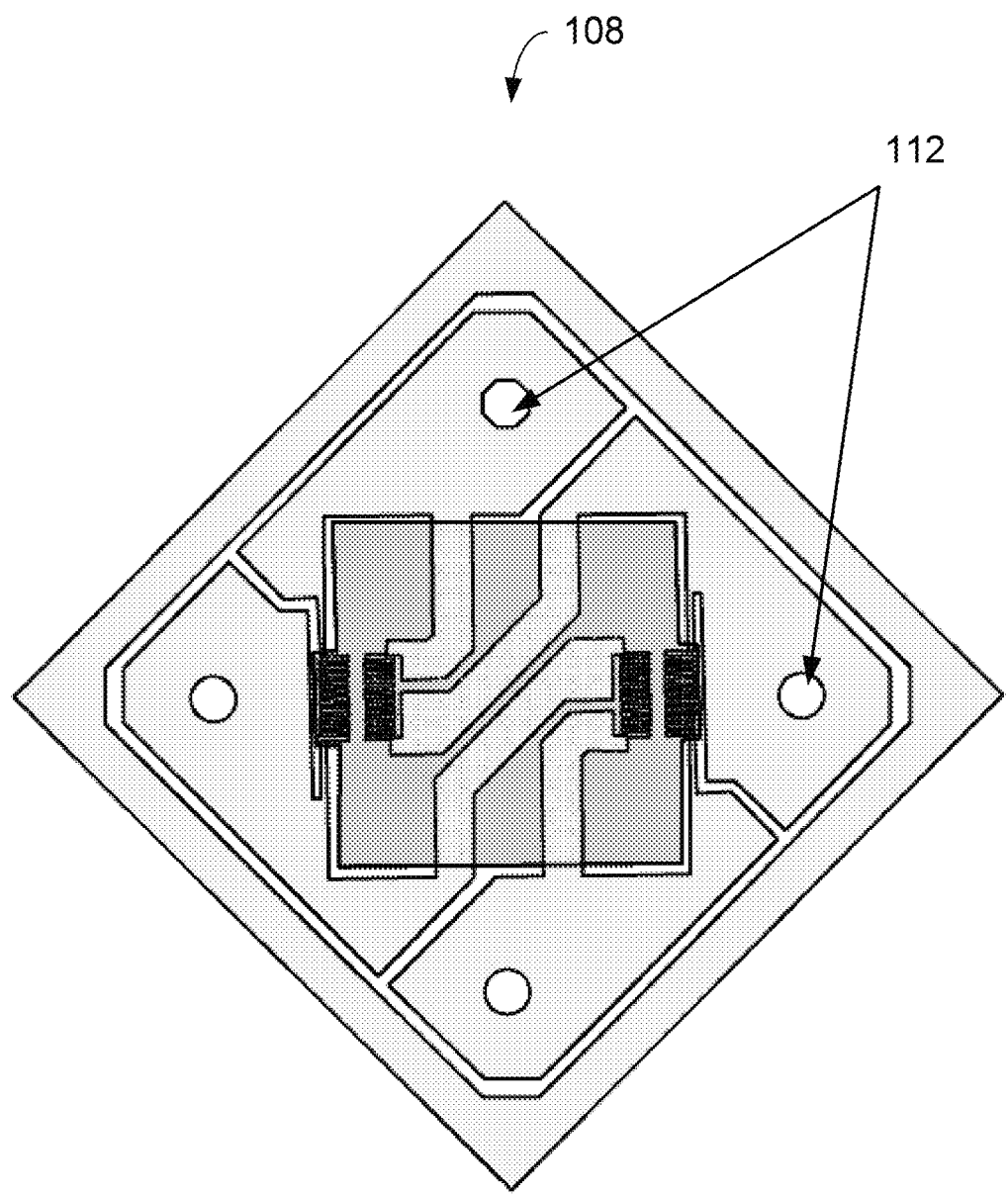
FIG. 2 depicts an example top view layout of the sensor chip 108, according to an example implementation of the disclosed technology.

FIG. 2 depicts an example top view layout of the sensor chip 108 (such as the sensor chip 108 depicted in FIG. 1) having the sensor chip contact pads 112 configured towards the periphery of the sensor chip 108. In this example implementation, the sensor chip 108 may have a similar structure as described in U.S. Pat. No. 5,955,771 (incorporated herein by reference) and U.S. Pat. No. 8,656,784 to Ned, et al., and assigned to Kulite Semiconductor Products, Inc., the Assignee of this Application, the contents of which are incorporated herein by reference.

Figure 3:
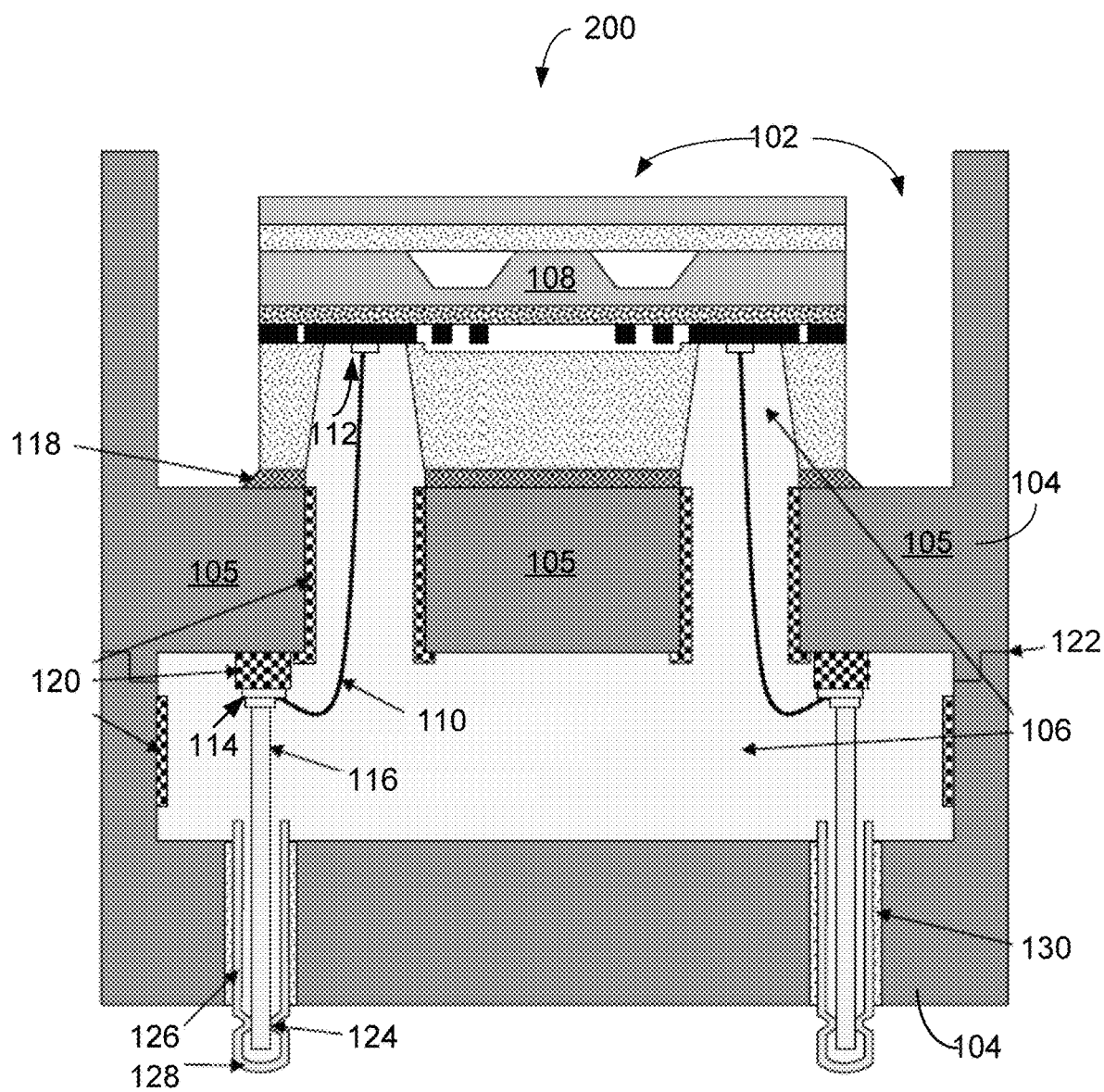
FIG. 3 depicts another example embodiment of a sensor device 200 structure, according to an example implementation of the disclosed technology.

FIG. 3 depicts another example embodiment of a sensor device 200 structure that may utilize a similar sensor chip 108 as previously discussed with respect to FIGS. 1 and 2. In this example embodiment, the sensor chip 108 and part of the electrical interconnections 110 scheme may be similar with that described in FIG. 1, with the difference being that the electrical isolators 120, pin contact pads 114, and associated feedthrough pins 116 may be located on the periphery of the sensor device 200, as opposed to the layout shown in FIG. 1, in which the electrical isolators 120, pin contact pads 114, and associated feedthrough pins 116 are located closer to the central vertical axis of the sensor device 100.

Figure 4:
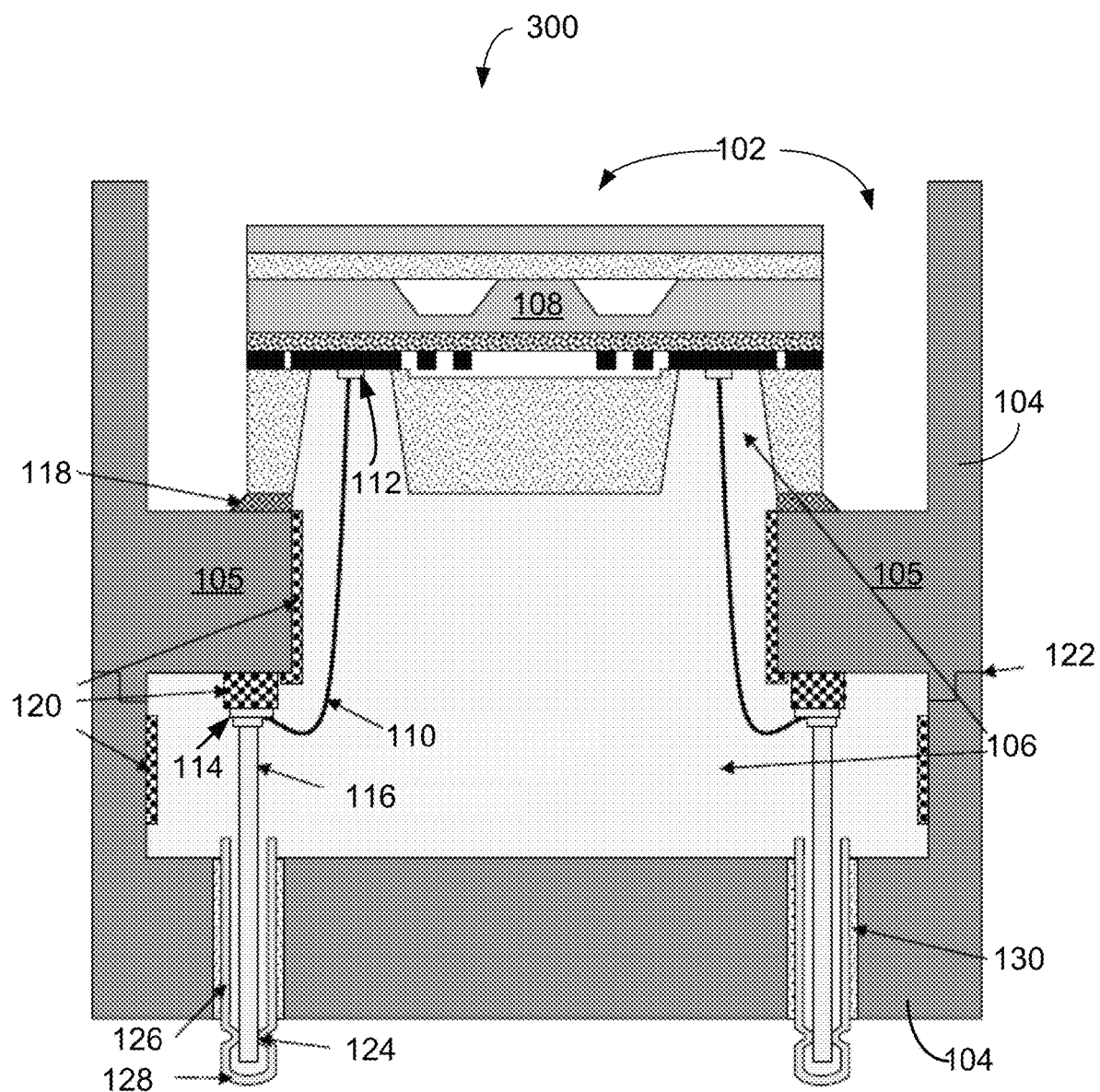
FIG. 4 depicts another example embodiment of a sensor device 300 structure, according to an example implementation of the disclosed technology.

FIG. 4 depicts another example embodiment of a sensor device 300 structure that may utilize a similar sensor chip 108 as previously discussed with respect to FIGS. 1-3. In this example embodiment, the sensor chip 108 and part of the electrical interconnections 110 scheme may be similar with that described in FIG. 3, with the difference being that the sensor chip 108 is supported only at the periphery of the support portion of the header 105, and without the central portion of the support portion of the header 105 being in the way. In the example embodiment, as shown in FIG. 4, the sealed interconnection environment 106 may have significantly more open space (compared with the embodiments shown in FIGS. 1 and 3), which may provide certain assembly benefits, for example for making the electrical interconnections 110 between the sensor chip contact pads 112 and the corresponding pin contact pads 114.

Figure 5:
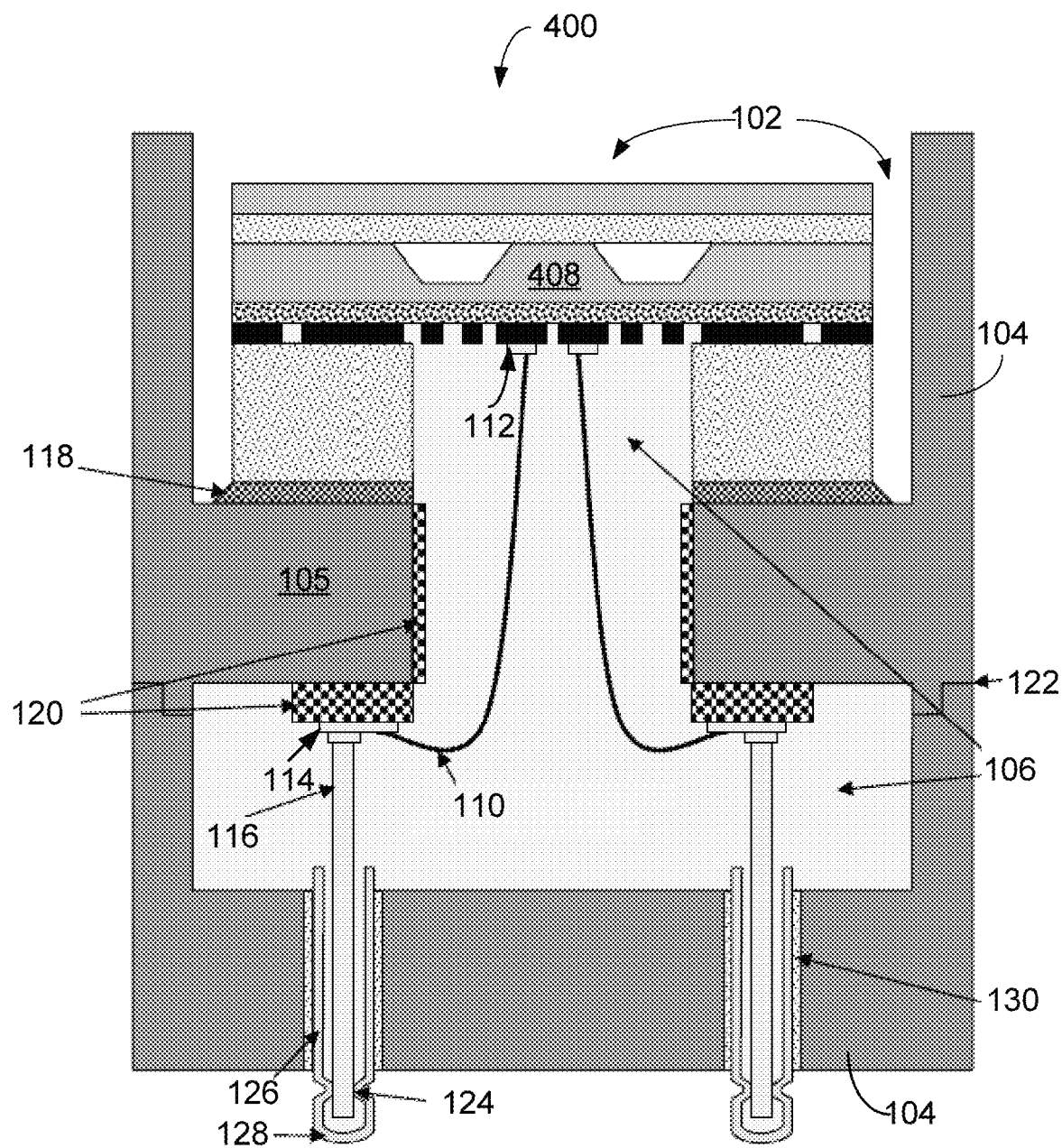
FIG. 5 depicts another example embodiment of a sensor device 400 structure, including a sensor chip 408, according to an example implementation of the disclosed technology.

FIG. 5 depicts another example embodiment of a sensor device 400 structure that may utilize a sensor chip 408 having a slightly different layout compared to the sensor chip 108 previously described and discussed with respect to FIGS. 1-4. Similar to the embodiment as shown in FIG. 4, the sensor chip 408 is supported at the periphery of the support portion of the header 105, and without the presence of a central portion of the support portion of the header 105. In the example embodiment, as shown in FIG. 5, the sealed interconnection environment 106 may also have significantly more open space (compared with the embodiments shown in FIGS. 1 and 3), which may provide certain assembly benefits, for example for making the electrical interconnections 110 between the sensor chip contact pads 112 and the corresponding pin contact pads 114, while allowing for a significantly larger mounting and support area for the sensor chip 408 on the support portion of the header 105. This significantly larger mounting and support area may allow for pressure sensing applications at higher pressure ranges while maintaining the same overall dimensions for the sensor chip 408 and for the overall sensor device 400.

Figure 6:
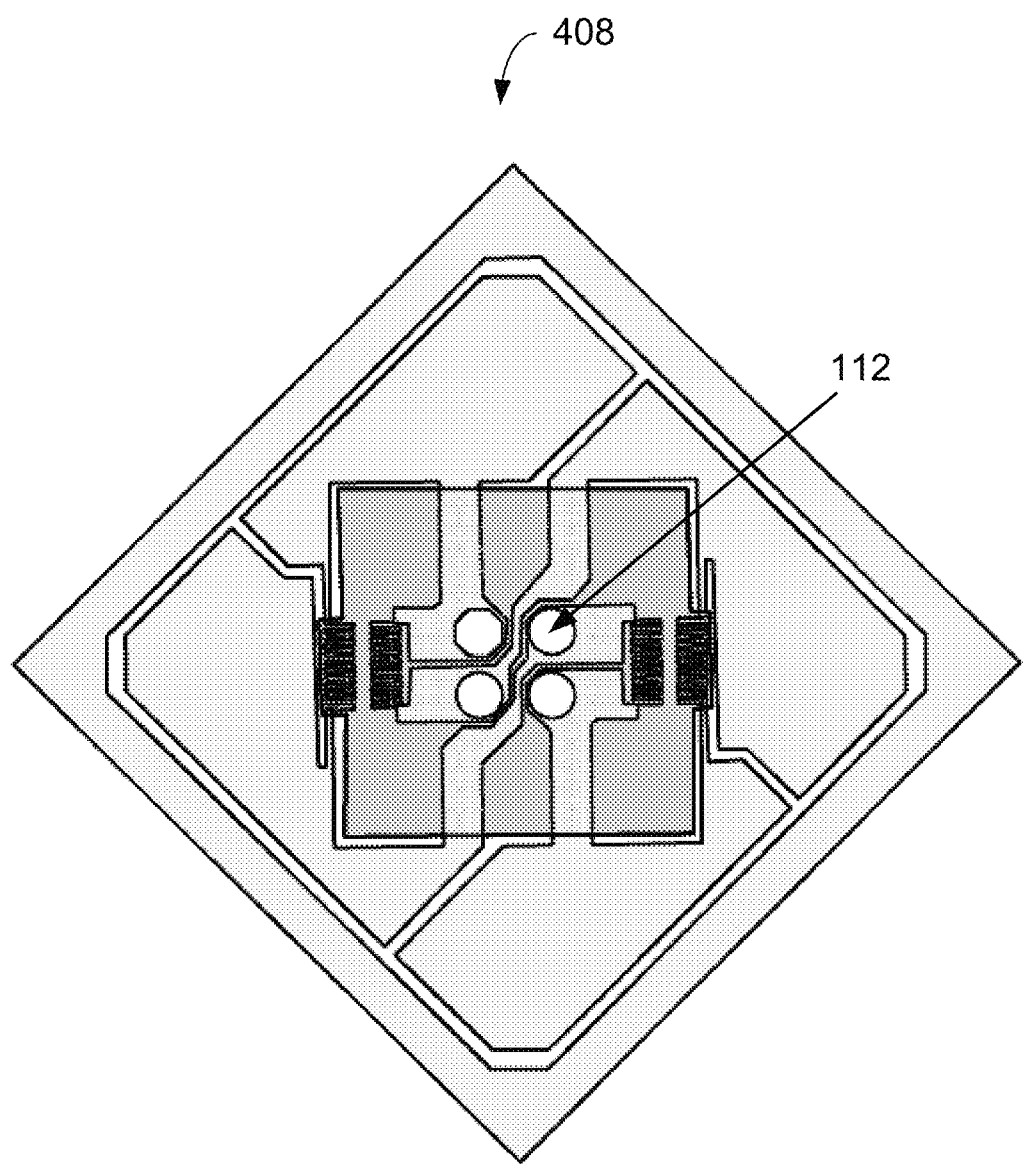
FIG. 6 depicts an example top view layout of the sensor chip 408, according to an example implementation of the disclosed technology.

FIG. 6 depicts a top view layout of the sensor chip 408 (for example, the sensor chip 408 as described in FIG. 5) and it differs from the previously described sensor chip (for example the sensor chip 108 as shown and described with respect to FIGS. 1-4) in that the sensor chip contact pads 112 may configured near the central portion of the sensor chip 408 (compared to the sensor chip contact pads 112 of the sensor chip 108 of FIG. 2, which are located closer to the periphery of the sensor chip 108). Referring again to FIG. 5, and for this sensor device 400 structure, the sensor chip contact pads 115 on the sensor chip 408 are relatively aligned with the central opening in support portion of the header 105, which may help facilitate installing the electrical interconnections 112 between the sensor chip contact pads 112 and the pin contact pads 114. According to an example implementation of the disclosed technology, the sensor chip 408 as shown in FIGS. 5 and 6 may be a pressure sensor chip having a pressure responsive diaphragm that has a centrally located boss or thicker region. In this example implementation, the sensor chip contact pads may be positioned under the thicker boss region of the sensor chip diaphragm.

Figure 7:
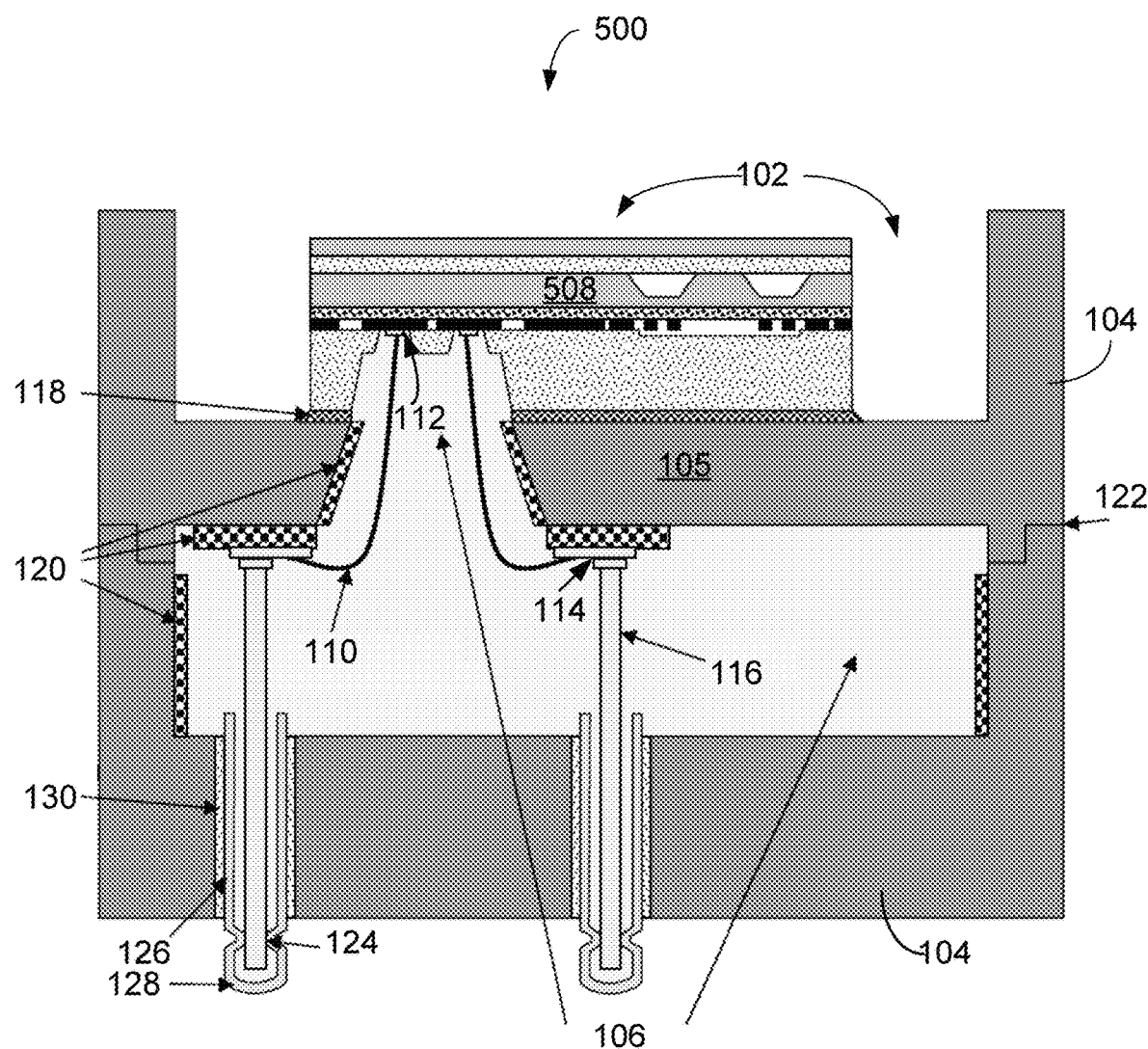
FIG. 7 depicts another example embodiment of a sensor device 500 structure having a sensor chip 508 with a different layout as compared with the previous example embodiments.

FIG. 7 depicts another example sensor device 500 structure configured for another sensor chip 508 with a different layout as compared with the previous examples. In this example implementation, the electrical interconnection 110 scheme may share some similarities with the sensor device 400 as described in FIG. 5, with the difference that the sensor chip contact pads 112 of the sensor chip 508 are offset from the center of the sensor chip 508, and opposite the measurement environment sensing area of the sensor chip 508.

Figure 8:
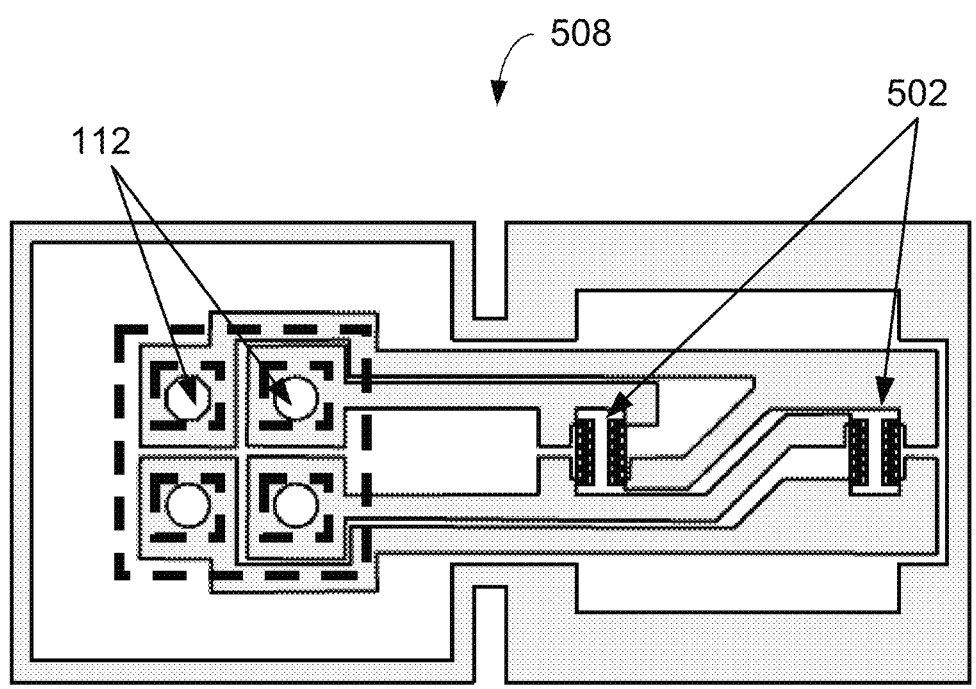
FIG. 8 depicts a top view layout of a sensor chip 508, as described with respect to the sensor device shown in FIG. 7.

FIG. 8 depicts a top view layout of the sensor chip 508 (for example, the sensor chip 508 as described in FIG. 7) and it differs from the previously described sensor chips (for example the sensor chip 108 as shown and described with respect to FIGS. 1-4 and the sensor chip 408 as shown and described with respect to FIGS. 5 and 6) in that the sensor chip contact pads 112 may be offset from the center of the sensor chip 508 and laterally offset from the sensing regions (s) 502 of the sensor chip 508. For example, the sensor chip contact pads 112 may be disposed on portions of pressure sensor chip regions with high stiffness and thus not significantly responsive to pressure. In this example implementation, the influence of stress or strain on the sensor output signal due to wire bonding, etc., may be reduced or eliminated.

FIG. 9 depicts another example sensor device 600 structure configured with a protective outer diaphragm 606 for providing a sealed sensor chip environment 608, according to an example implementation of the disclosed technology. In an example implementation, the outer diaphragm 606 may be made with a metal, for example, a metal that may be the same as that used for the header 104, and/or compatible with sealing 122 to the header 104 components. According to an example implementation of the disclosed technology, the outer diaphragm 606 may include a diaphragm protrusion 610 that may act as a pushrod and may be in contact with a pressure sensing region of the sensor chip 108. In accordance with an example implementation of the disclosed technology, the outer metal diaphragm 606 may be configured with a thickness/stiffness that will allow pressure exerted from outside the sensor device to deflect the metal diaphragm 606 and transfer the associated movement through the protrusion 610 and to the pressure sensing region of the sensor chip 108.

The example sensor device 600 as shown in FIG. 9 has many similarities to the sensor device 100 as depicted in FIG. 1, with the exception of the outer metal diaphragm 606 (with the associated sealed sensor chip environment 608) and a possible configuration of the support portion of the header 105, which in certain example implementations, may be configured as a separate adapter or insert 612.

According to an example implementation of the disclosed technology, all of the metal contacts 112, 114 and electrical interconnections 110 of the sensor device 600 may be contained in a first sealed inert interconnect environment 106, and all the remaining portions of the sensor chip 108 that are not contained in the first sealed inert interconnect environment 106, may be contained in the sealed sensor chip environment 608.

The sensor device 600 may include many or all of the features of previously discussed example implementations, such as the electrical interconnections 110 between the sensor chip contact pads 112 and the pin contact pads 114, the feedthrough pins 116, support portions of the header 105, etc. Furthermore, as previously discussed, the header components (i.e., the header 104 and the header adapter or insert 612, and the outer metal diaphragm 606) may be joined and sealed (for example with a header weld 122) to provide an inert and sealed interconnect environment 106. In an example implementation, the header weld 122 may be made by electron beam welding, brazing, or other appropriate joining/sealing technique.

According to certain example implementations of the disclosed technology, the header weld 122 may be made at the same time, or after the metal feedthrough pins 116 and/or feedthrough inserts 126 are installed and sealed to the header 104. For example, if the feedthrough pins 116 are sealed (to the feedthrough inserts 126 and) to the header 104 after the two header components 104, 612 are joined and sealed together, then the sealing and joining process of the feedthrough pins 116 (and associated inserts 126 and electrically isolating seal 130) to the header 104 may be preferably performed in an inert environment, resulting in a sensor device 600 structure having all metal contacts 112, 114 and all electrical interconnections 110 contained in a sealed, inert interconnect environment 106.

FIG. 10 depicts another example sensor device 700 structure that includes a protective outer diaphragm 606 for providing a sealed sensor chip environment 608, according to an example implementation of the disclosed technology. In this example implementation, the sensor chip 408 may be utilized, and the configuration of the sensor device 700 may include similarities to the previously discussed sensor device 400 and sensor chip 408 as described above with respect to FIGS. 5 and 6, but with the added outer diaphragm 606 with the associated protrusion 610.

With reference to FIGS. 9 and 10, and in a similar manner as previously discussed, the sealed interconnect environment 106 may be configured by sealing (in an inert environment) the feedthrough pins 116 (and/or associated feedthrough inserts 126 and electrically isolating seals 130) to the header 104, by sealing 118 the sensor chip to the support portion of the header 104, and by joining and sealing 122 the bottom portion of the header 104 with the support portion 105 to form the internal enclosure. In an example implementation, the header weld 122 may be performed by resistance welding, brazed, or permanently joined mechanically and electrically by another appropriate metal joining technique. In an example implementation, the outer metal diaphragm 606 may be attached to the header 104 (for example, at the support portion 105) and also sealed 122 under an inert environment before, at the same time, or after the sealing to provide the sealed sensor chip environment 608 and the sealed interconnect environment 106. In accordance with an example implementation of the disclosed technology, the outer metal diaphragm 606 component may be installed by placing it over the sensor chip 108, 408 so that the protrusion 610 touches or is in contact with the pressure responsive diaphragm portion of the sensor chip, thereby enabling the transfer of force from the applied pressure to the sensor chip. In accordance with an example implementation of the disclosed technology, the outer metal diaphragm 606 may be made from Kovar, stainless steel, Inconel, nickel, tungsten, molybdenum, platinum, or from other high temperature metal or metal alloy, and could have a plated or deposited metal layer of gold or platinum, or other suitable metal or metal alloy. In an example implementation, the outer metal diaphragm 606 may be joined and sealed 122 to the header 104 (and/or to the support portion of the header 105) in a second inert environment, preferably by electron beam welding, or by brazing, or other appropriate joining technique, resulting in a device structure with the sensor chip contained in the sealed sensor chip inert environment 608.

According to an example implementation of the disclosed technology, sealed interconnect environment 106 may be made and sealed in the same inert environment as is done for the sealed sensor chip environment 608. In another example implementation, these two environments 106, 608 may be different. In certain example implementations, these two environments 106, 608 may be made/created at the same time, or independent of each other.

FIG. 11 depicts another sensor device 800 structure having a sealed environment 812 and having a sensor chip 808 disposed directly on a support portion 805 of the base of the header 104, according to an example implementation of the disclosed technology. In this example implementation a pushrod 810 may be utilized to transfer external pressure from the outer metal diaphragm 606 (and optional protrusion 610) to the pressure-sensitive portion of the sensor chip 808.

FIG. 12 shows a top-view layout and an electrical interconnection scheme for a high temperature sensor chip 808, as utilized in the sensor device 800 of FIG. 11, and according to an example implementation of the disclosed technology. Also shown in FIG. 12 is the approximate position of the pushrod 810, the sensing regions 802, and the sensor chip contact pads 112.

With reference again to FIG. 11, the sensor device 800 may be configured with a protective outer metal diaphragm 606 that may be sealed 122 to the header 104 so that all the internal metal contacts 112, all internal electrical interconnections 110, and the entire sensor chip 808 is contained in the same sealed inert environment 812, as opposed to the previously described sensor devices 600, 700 which may have three header components 104, 105, 606, and two separate sealed inert environment regions 106, 608: one containing metal contacts and electrical interconnections, and the other containing the sensor chip.

In this example implementation, the sensor device 800 may include only two components that need to be joined and sealed 122 to provide the internal sealed environment 812: the base of the header 104 and the protective outer metal diaphragm 606. In an example implementation, the feedthrough pins 116 and electrically isolating seal 130 (and/or or other sealed electrical feedthrough inserts—not shown) may be similar to those shown and described with reference to the previous figures. In an example implementation, the protective outer metal diaphragm 606 may be similar to the protective outer metal diaphragm 606 as discussed with respect to FIGS. 9 and 10. However, in the sensor device 800, the electrical interconnections 110 may be made directly from the sensor chip contact pads 112 to the feedthrough pins 116 (and/or other sealed electrical feedthrough inserts—not shown). According to an example implementation of the disclosed technology, the sensor chip 808 may be functionally similar, and may have certain similarities to the previously described sensor chips 108, 408; however, the sensor chip 808 and associated sensor device 800 as shown in FIGS. 11 and 12 do not require vias or other openings in the sensor chip substrate, as shown with respect to FIGS. 1, 3-5, 7, 9, and 10. Certain example implementations of the sensor device 800 may provide a protective environment sealed in a simpler header structure and may enable a reduction in the number of components and/or processing steps required in the manufacturing of the sensor device 800.

In an example implementation, the pushrod 810, as shown in FIG. 11 may be eliminated, and the protrusion 610 of the outer metal diaphragm 606 may directly contact with the top portion of the sensor chip 808. In accordance with an example implementation of the disclosed technology, the outer metal diaphragm 606 may be installed with appropriate pre-loading contact (either via the pushrod 810, or directly on the sensor chip 808) and sealed with a header weld 122 to the base portion of the header 104, using the methods as previously discussed.

In an example implementation, the sensor chip 808 may be attached or secured to the support portion 805 of the base of the header 104. According to an example implementation of the disclosed technology, the sensor chip 808 may be attached or secured to the support portion 805 of the base of the header 104 using an adhesive, by using a glass seal 118, and/or by other appropriate sealing or mounting material or techniques. Next, and in accordance with an example implementation, the electrical interconnections 110 may be made between the sensor chip contact pads 112 and the feedthrough pins 116 (and other sealed electrical feedthroughs) by wire bonding, welding, or other appropriate technique for joining metal wires to contacts. In an example implementation, the electrical interconnections 110 wires may be made of gold, aluminum, nickel, platinum, or other suitable metal or metal alloy.

In an example implementation, making the electrical interconnections 110 in the sensor device 800 scheme as shown in FIG. 11 (for example, using wire bonding) may provide significant advantages in terms of assembly, particularly since the metal contacts 112 may be readily accessible and may allow easy access for wire bonding, welding, or other metal joining tools, without having to negotiate any relatively narrow openings or vias in the sensor chips such as in FIG. 1.

As shown in FIGS. 11 and 12, and according to an example implementation of the disclosed technology, a pushrod 810 (or similar component) may be located and attached to the central region of the sensor chip 808 and in alignment with the pressure responsive diaphragm. According to various example embodiments, the pushrod 810 may be made from glass, from silicon, or from other appropriate material. In certain example implementations, the pushrod 810 may be attached to the sensor chip using electrostatic or anodic bonding, bonding or sealing using glass powders or frits, or other suitable high temperature materials. In accordance with an example implementation of the disclosed technology, the pushrod 810 bonded and attached to the sensor chip 808 diaphragm region may accommodate the protrusion 610 from outer metal diaphragm 606, and may acts as physical linkage (together with the protrusion 610 and/or the outer metal diaphragm 606) for transmitting the force resulting from the pressure applied to or collected by outer metal diaphragm 606. In accordance with an example implementation of the disclosed technology, the outer metal diaphragm 606 and the base of the header 104 may be joined and sealed (for example, with a header weld 122) in an inert environment, preferably by electron beam welding, or by brazing, or other appropriate joining technique, resulting in a device structure with all internal metal contacts, all internal electrical interconnections, and the entire sensor chip contained in a sealed inert environment 812.

Figure 13:
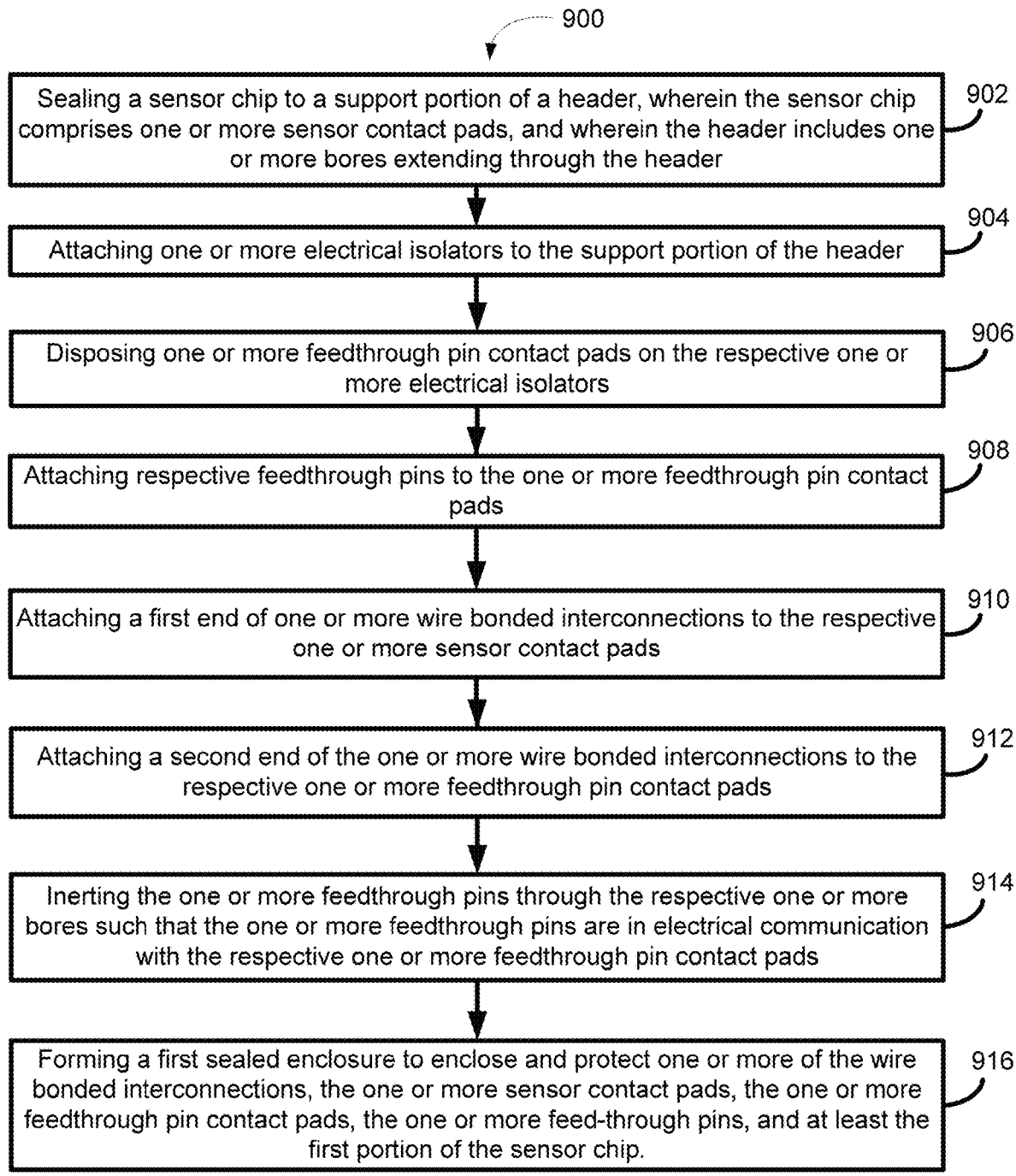
FIG. 13 is a flow diagram of a method 900, according to an example implementation of the disclosed technology.

FIG. 13 is a flow diagram of a method 900, according to an example implementation of the disclosed technology. In block 902, the method 900 includes sealing a sensor chip to a support portion of a header, wherein the sensor chip comprises one or more sensor contact pads, and wherein the header includes one or more bores extending through the header. In block 904, the method 900 includes attaching one or more electrical isolators to the support portion of the header. In block 906, the method 900 includes disposing one or more feedthrough pin contact pads on the respective one or more electrical isolators. In block 908, the method 900 includes attaching respective feedthrough pins to the one or more feedthrough pin contact pads. In block 910, the method 900 includes attaching a first end of one or more wire bonded interconnections to the respective one or more sensor contact pads. In block 912, the method 900 includes attaching a second end of the one or more wire bonded interconnections to the respective one or more feedthrough pin contact pads. In block 914, the method 900 includes installing one or more feedthrough pins through the respective one or more bores such that the one or more feedthrough pins are in electrical communication with the respective one or more feedthrough pin contact pads. In block 916, the method 900 includes forming a first sealed enclosure to enclose and protect one or more of the wire bonded interconnections, the one or more sensor contact pads, the one or more feedthrough pin contact pads, the one or more feedthrough pins, and at least the first portion of the sensor chip.

Certain example implementations may further include installing a protective outer diaphragm in communication with the sensor chip and forming a second sealed enclosure by at least a portion of the protective outer diaphragm and by a second portion of the sensor chip. The second sealed enclosure is configured to enclose and protect at least the second portion of the sensor chip.

According to an example implementation of the disclosed technology, the protective outer diaphragm can include a protrusion, and installing the protective outer diaphragm in communication with the sensor chip can include disposing the protrusion so that it is in mechanical communication with at least a portion of the sensor chip, such as a pressure sensitive portion of the sensor chip. In this manner, pressure outside of the sensor device may be transferred to the sensor chip by the protective outer diaphragm.

In certain example implementations, the one or more electrical isolators may be configured to prevent electrical communication between the one or more wire bonded interconnections and the header.

Certain example implementations can include installing one or more electrical isolators between the one or more feedthrough pins and the header, the one or more electrical isolators are configured to prevent electrical communication between the one or more feedthrough pins and the header.

In accordance with an example implementation of the disclosed technology, one or more of the first sealed enclosure and the second sealed enclosure may be formed in an inert environment.

According to an example implementation of the disclosed technology, installing the one or more feedthrough pins can include installing one or more pin inserts through the header and in electrical communication with the respective one or more feedthrough pins, and securing the one or more pin inserts to the header by electrically isolating seals.

In certain example implementations, the one or more pin inserts can be characterized by a metal cylinder having an open end and a closed end. The open end extends into the first sealed enclosure and is configured to accept a respective feedthrough pin. The closed end extends outside of the header and is configured to at least partially seal the first enclosure.

According to an example implementation of the disclosed technology the one or more wire bonded interconnections comprise one or more of gold, copper, aluminum, nickel, platinum, and/or a metal alloy.

As disclosed herein, the sensor device is configured for use in measurement environments in which the sensor device may be exposed to temperature above 400° C. In some implementations, the sensor device is configured for use in measurement environments in which the sensor device may be exposed to temperature above 500° C. In some implementations, the sensor device is configured for use in measurement environments in which the sensor device may be exposed to temperature above 600° C.

Certain example implementation of the disclosed technology may greatly slow down interdiffusion of the various metals used in the contact pads, wire bonded interconnections, pins, and sensor chip, thus allowing the device to survive at higher temperatures (for example, above 600° C.) for extended periods.

Certain example implementation of the disclosed technology may utilize the enclosure and sealing techniques and elements disclosed herein to protect the wire bonded interconnections and other sensor device components against corrosive and/or oxidizing media.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

What is claimed is:

1. A method, comprising:
    positioning one or more feedthrough pin assemblies in a sensor header, each of the one or more feedthrough pin assemblies comprising a feedthrough pin and a respective pin insert, the sensor header comprising a sensor support portion, one or more feedthrough pin apertures extending through the sensor header, and respective one or more feedthrough pin contact pads that are electrically isolated from the sensor header;
    electrically connecting the one or more feedthrough pin assemblies to the respective one or more feedthrough pin contact pads of the sensor header;
    securing, with electrically isolating seals, the one or more feedthrough pin assemblies to the respective one or more feedthrough pin apertures in the sensor header;
    mounting a sensor chip to the sensor support portion of the sensor header, wherein the sensor chip comprises one or more sensor contact pads; and
    electrically connecting the one or more sensor contact pads of the sensor chip directly to the respective one or more feedthrough pin contact pads of the sensor header.

2. The method of claim 1, further comprising:
    inserting each feedthrough pin of the one or more feedthrough pin assemblies into the respective pin insert, wherein each respective pin insert comprises a conductive cylinder having an open end and a closed; and
    electrically connecting each feedthrough pin to the respective pin insert to form the one or more feedthrough pin assemblies.

3. The method of claim 1, wherein electrically connecting the one or more sensor contact pads of the sensor chip directly to the respective one or more feedthrough pin contact pads of the sensor header comprises:
    attaching a first end of one or more wire bond interconnections to a respective sensor contact pad of the one or more sensor contact pads; and
    attaching a second end of the one or more wire bond interconnections to a respective feedthrough pin contact pad of the one or more feedthrough pin contact pads.

4. The method of claim 3, wherein the one or more wire bond interconnections comprise one or more of gold (Au), copper (Cu), aluminum (Al), nickel (Ni), platinum (Pt), and a metal alloy.

5. The method of claim 3, further comprising forming a first sealed enclosure comprising the sensor header, wherein the first sealed enclosure protects at least a portion of the one or more wire bond interconnections, the one or more sensor contact pads, the one or more feedthrough pin contact pads, the one or more feedthrough pin assemblies, and a first portion of the sensor chip.

6. The method of claim 5, wherein the first sealed enclosure is formed in an inert environment.

7. The method of claim 5, further comprising measuring a pressure at a temperature above 400° C.

8. The method of claim 1, further comprising:
    installing a protective outer diaphragm in communication with the sensor chip; and
    forming a second sealed enclosure by at least a portion of the protective outer diaphragm, the second sealed enclosure configured to enclose and protect at least a second portion of the sensor chip.

9. The method of claim 8, wherein the protective outer diaphragm comprises a protrusion, and wherein installing the protective outer diaphragm in communication with the sensor chip comprises disposing the protrusion in mechanical communication with at least a portion of the sensor chip.

10. The method of claim 1, wherein securing the one or more feedthrough pin assemblies to the respective one or more feedthrough pin apertures comprises securing respective pin insert portions of the one or more feedthrough pin assemblies to the respective one or more feedthrough pin apertures with the electrically isolating seals.

11. The method of claim 1, wherein positioning the one or more feedthrough pin assemblies in in the sensor header comprises orienting the one or more feedthrough pin assemblies such that a closed end of the respective one or more pin inserts extends outside of the sensor header.

12. The method of claim 1, wherein one or more of the feedthrough pin contact pads are disposed on the sensor support portion of the sensor header.

13. The method of claim 1, wherein the electrically isolating seals are configured to prevent electrical communication between the one or more feedthrough pin assemblies and the sensor header.

14. The method of claim 2, wherein each of the pin inserts comprise a metal.

15. A method, comprising:
    positioning one or more feedthrough pin assemblies into respective one or more feedthrough pin apertures in a sensor header, each feedthrough pin assembly of the one or more feedthrough pin assemblies comprising a conductive cylindrical pin insert having an open end and a closed end and a feedthrough pin disposed in the open end;
    electrically connecting the one or more feedthrough pin assemblies to respective one or more feedthrough pin contact pads of the sensor header; and
    securing the one or more feedthrough pin assemblies to the respective one or more feedthrough pin apertures in the sensor header with electrically isolating seals such that closed end of the respective one or more pin inserts extend outside of the sensor header.

16. The method of claim 15, further comprising mounting a sensor chip to a support portion of the sensor header, wherein the sensor chip comprises one or more sensor contact pads.

17. The method of claim 16, further comprising:
attaching a first end of one or more wire bond interconnections to a respective sensor contact pad of the one or more sensor contact pads of the sensor chip; and
attaching a second end of the one or more wire bond interconnections to a feedthrough pin contact pad of the respective one or more feedthrough pin contact pads of the sensor header.

18. The method of claim 17, further comprising forming a first sealed enclosure comprising the sensor header, wherein the first sealed enclosure protects at least a portion of the one or more wire bond interconnections, the one or more sensor contact pads, the one or more feedthrough pin contact pads, the one or more feedthrough pin assemblies, and a first portion of the sensor chip.

19. The method of claim 18, wherein the first sealed enclosure is formed in an inert environment.

20. The method of claim 18, further comprising measuring a pressure at a temperature above 400° C.

* * * * *